United States Patent
Usher et al.

(10) Patent No.: US 8,447,031 B2
(45) Date of Patent: May 21, 2013

(54) METHOD AND EARPIECE FOR VISUAL OPERATIONAL STATUS INDICATION

(75) Inventors: John Usher, Montreal (CA); Steven Goldstein, Delray Beach, FL (US); Marc Boillot, Plantation, FL (US)

(73) Assignee: Personics Holdings Inc., Boca Raton, FL (US)

( * ) Notice: Subject to any disclaimer, the term of this patent is extended or adjusted under 35 U.S.C. 154(b) by 1138 days.

(21) Appl. No.: 12/351,959

(22) Filed: Jan. 12, 2009

(65) Prior Publication Data
US 2009/0264161 A1 Oct. 22, 2009

Related U.S. Application Data

(60) Provisional application No. 61/020,402, filed on Jan. 11, 2008.

(51) Int. Cl.
*H04M 1/00* (2006.01)

(52) U.S. Cl.
USPC .......................... 379/430; 381/376; 455/575.2

(58) Field of Classification Search
USPC ........ 379/430; 381/374, 375, 376; 455/569.1, 455/575.2
See application file for complete search history.

(56) References Cited

U.S. PATENT DOCUMENTS

| | | | |
|---|---|---|---|
| 5,210,791 A | 5/1993 | Krasik | |
| 5,359,647 A | 10/1994 | Regen et al. | |
| 5,608,794 A | 3/1997 | Larson | |
| 5,995,824 A * | 11/1999 | Whitfield | 455/412.1 |
| 6,570,983 B1 | 5/2003 | Speeney et al. | |
| 6,879,688 B2 * | 4/2005 | Winegar | 379/430 |
| 2005/0129259 A1 * | 6/2005 | Garner | 381/172 |
| 2007/0291974 A1 * | 12/2007 | Eisenbraun | 381/370 |
| 2009/0202096 A1 * | 8/2009 | Ryann | 381/374 |

OTHER PUBLICATIONS

U.S. Appl. No. 11/942,370, filed Nov. 19, 2007.

* cited by examiner

*Primary Examiner* — Olisa Anwah
(74) *Attorney, Agent, or Firm* — RatnerPrestia

(57) ABSTRACT

An earpiece can include an Ambient Sound Microphone (ASM), an Ear Canal Receiver (ECR), a transceiver, an illumination element, and a processor to provide visual operational mode indication via the illumination element. The operational mode can correspond to an active phone call, an incoming phone call, a terminated phone, a caller-on-hold condition, a recording mode, a voice mail mode, a mute mode, an audible transparency mode or an ear-plug mode. The intensity, frequency, amplitude, color or duration of the lighting can be adjusted according to the operational mode.

23 Claims, 4 Drawing Sheets

METHOD AND EARPIECE FOR VISUAL OPERATIONAL STATUS INDICATION

CROSS REFERENCE TO RELATED APPLICATIONS

This Application is a Non-Provisional and claims the priority benefit of Provisional Application No. 61/020,402 filed on Jan. 11, 2008, the entire contents of which are incorporated herein by reference.

FIELD

The present invention relates to an earpiece, and more particularly, though not exclusively, to a method and device for visually illuminating the earpiece to indicate operational status.

BACKGROUND

A mobile device earpiece permits hands-free audio communications when communicatively coupled to a paired mobile device. At times, the mobile device user can refer to a display of the paired mobile device for interacting with the earpiece.

Other people in close proximity to the mobile device user however may be unaware when the mobile device user is operating the earpiece. This can be frustrating to other people since the mobile device user by way of the earpiece may be engaged in a conversation of which the other people are unaware. In such cases, the other people do not know whether the person is talking to them or not.

A need therefore exists for mitigating the confusion associated with operating an earpiece in public.

SUMMARY

A method and earpiece for visual operational status indication is provided.

In a first embodiment, an earpiece can include an Ambient Sound Microphone (ASM) to capture ambient sound, an Ear Canal Receiver (ECR) to deliver audio to an ear canal, a transceiver to receive and transmit communication signals from a paired communication device, an illumination element to provide light, and a processor operatively coupled to the ASM, the ECR, and the transceiver to provide visual operational mode indication via the illumination element. The operational mode can correspond to an active phone call, an incoming phone call, a terminated phone, a caller-on-hold condition, a recording mode, a voice mail mode, a mute mode, an audible transparency mode or an ear-plug mode. The intensity, frequency, amplitude, color or duration of the lighting can be adjusted according to the operational mode.

The earpiece can further include an Ear Canal Microphone (ECM) to monitor a sound pressure level (SPL) within the ear canal and capture bone conducted voice signals within the ear canal. The processor can regulate a delivery of ambient sounds in the environment by way of the ASM to the ear canal by way of the ECR to provide audible transparency while controlling a lighting of the illumination element based on a level of the audible transparency. The earpiece can detect spoken voice within the ear canal by way of the ECM and adjust the lighting based on a voice activity level of the spoken voice to indicate activity.

In a second embodiment, a method for operating an earpiece can include the steps of receiving ambient sound from an Ambient Sound Microphone (ASM), delivering audio to an Ear Canal Receiver (ECR) directed to an ear canal, receiving and transmitting communication signals from a paired communication device, determining an operational mode of the earpiece from audio signals received from the ASM, audio signals delivered to the ECR and the communication signals, and controlling a lighting of an illumination element of the earpiece based on the operational mode for visually indicating an earpiece mode. An intensity, frequency, amplitude, color or duration of the lighting can be adjusted responsive to determining the operational mode.

The method can include identifying sounds in the environment by way of the ASM and lighting the illumination element according to an identified sound. The lighting can be controlled based on a threat detection level of an identified warning sound. The method can include detecting a sound pressure level (SPL) within the ear canal by way of the ECM, regulating a delivery of ambient sounds in the environment by way of the ASM to the ear canal by way of the ECR to provide audible transparency, and controlling the lighting based on the SPL and the audible transparency to indicate a level of situational awareness. The lighting can further be adjusted according to a user's hearing acuity.

In a third embodiment, an earpiece can include an Ambient Sound Microphone (ASM) to capture ambient sound from an ambient environment, an Ear Canal Receiver (ECR) to deliver audio to an ear canal, an Ear Canal Microphone (ECM) operatively coupled to the processor to monitor a sound pressure level (SPL) within the ear canal and capture bone conducted voice signals within the ear canal, a sealing section to attenuate background noise levels passing from the ambient environment to the ear canal by way of the ASM and ECR, an illumination element to provide light; and a processor to analyze sound levels from the ASM, ECM and ECR, determine a level of acoustic isolation of the sealing section, and control a lighting of the illumination element based on the level of acoustic isolation by adjusting an intensity, frequency, amplitude, color or duration of the lighting. A touch-sensitive button on the earpiece can establish an operating mode and a lighting of the illumination element.

DETAILED DESCRIPTION

Figure 1:
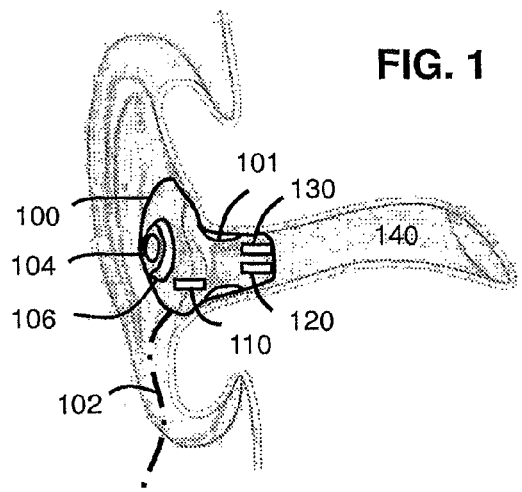
FIG. 1 is a pictorial diagram of an earpiece in accordance with an exemplary embodiment.

The following description of at least one exemplary embodiment is merely illustrative in nature and is in no way intended to limit the invention, its application, or uses. Similar reference numerals and letters refer to similar items in the following figures, and thus once an item is defined in one figure, it may not be discussed for following figures.

At least one exemplary embodiment of the invention is directed to an earpiece that via a visual indicator identifies operational modes of the earpiece or operational modes of a communication device. The visual indicator can flash on and off or change color intermittently to indicate an operational mode such as when the user is engaged in a voice call, checking voice mail, listening to audio content from a media player, or does not wish to be disturbed.

Reference is made to FIG. 1 in which an earpiece device, generally indicated as earpiece 100, is constructed in accordance with at least one exemplary embodiment of the invention. Earpiece 100 includes an Ambient Sound Microphone (ASM) 110 to capture ambient sound, an Ear Canal Receiver (ECR) 120 to deliver audio to an ear canal 140, and an ear canal microphone (ECM) 130 to assess a sound exposure level within the ear canal. Audio content can be delivered via a wired connection 102 or via wireless communications. The earpiece 100 can partially or fully occlude the ear canal 140 by way of the sealing section 101 to provide various degrees of acoustic isolation.

The earpiece 100 includes an illumination element 106 to provide lighting, and at least one touch sensitive button 104 to establish an operating mode. The operating mode can correspond to an active phone call, an incoming phone call, a terminated phone, a caller-on-hold condition, a recording mode, a voice mail mode, a mute mode, an audible transparency mode or an ear-plug mode. Other operating modes can be enabled by other means than the touch sensitive button 104, for example, by way of a paired mobile communication device.

The illumination element 106 can be a Light Emitting Diode (LED) or other semiconductor device that emits light when an electric current is applied to it. As one example, a low-level voltage can be applied across a resistor to bias the illumination element and generate light by way of electroluminescence of a p-n junction in a solid state material. The illumination element 106 can include an optical device to shape the lighting pattern and assist in reflection for enhancing or altering the lighting. The illumination element 106 can be a single color Light Emitting Diode (LED) or a multi-color LED.

The earpiece 100 can actively monitor a sound pressure level both inside and outside an ear canal 140 and enhance spatial and timbral sound quality to ensure safe reproduction levels. The earpiece 100 in various embodiments can provide listening tests, filter sounds in the environment, monitor warning sounds in the environment, present notices based on identified warning sounds, adjust audio content levels with respect to ambient sound levels, and filter sound in accordance with a Personalized Hearing Level (PHL). The earpiece 100 is suitable for use with users having healthy or abnormal auditory functioning. The earpiece 100 can be an in the ear earpiece, behind the ear earpiece, receiver in the ear, open-fit device, or any other suitable earpiece type. Accordingly, the earpiece 100 can be partially or fully occluded in the ear canal 140.

Figure 2:
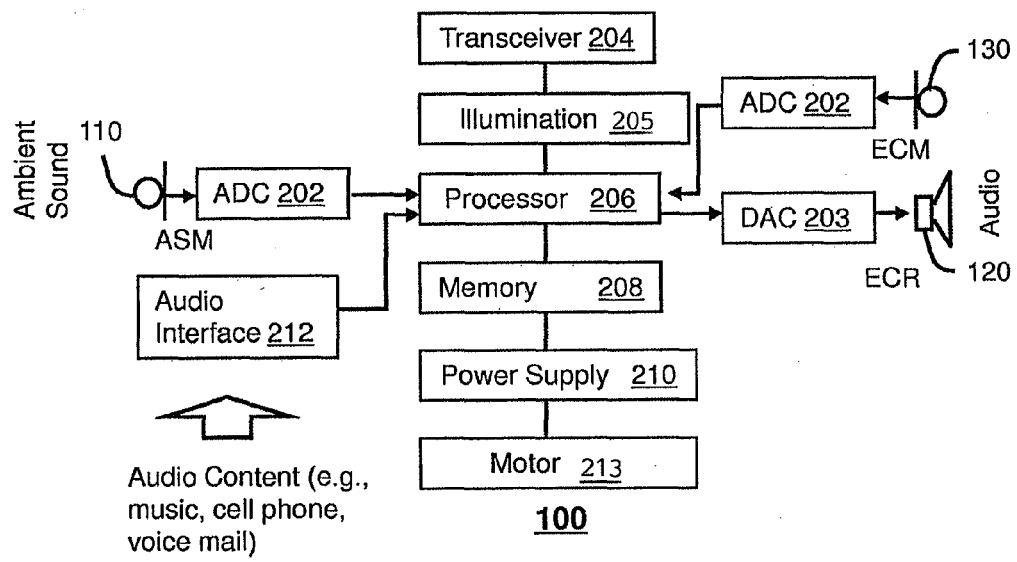
FIG. 2 is a block diagram of the earpiece in accordance with an exemplary embodiment.

Referring to FIG. 2, a block diagram of the earpiece 100 in accordance with an exemplary embodiment is shown. As illustrated, the earpiece 100 can further include a processor 206 operatively coupled to the ASM 110, ECR 120, and ECM 130, via one or more Analog to Digital Converters (ADC) 202 and Digital to Analog Converters (DAC) 203. The processor 206 can produce audio from at least in part the ambient sound captured by the ASM 110, and actively monitor the sound exposure level inside the ear canal 140. The processor responsive to monitoring the sound exposure level can adjust the audio in the ear canal 140 to within a safe and subjectively optimized listening level range. The processor 206 can control a lighting of the illumination element 205 to visually identify an operational mode of the earpiece. The processor 206 can utilize computing technologies such as a microprocessor, Application Specific Integrated Chip (ASIC), and/or digital signal processor (DSP) with associated storage memory 208 such as Flash, ROM, RAM, SRAM, DRAM or other like technologies for controlling operations of the earpiece device 100.

The earpiece 100 can further include a transceiver 204 that can support singly or in combination any number of wireless access technologies including without limitation Bluetooth™, Wireless Fidelity (WiFi), Worldwide Interoperability for Microwave Access (WiMAX), and/or other short or long range communication protocols. The transceiver 204 can also provide support for dynamic downloading over-the-air to the earpiece 100. It should be noted that next generation access technologies can also be applied to the present disclosure.

The earpiece 100 can also include an audio interface 212 operatively coupled to the processor 206 to receive audio content, for example from a media player, and deliver the audio content to the processor 206. The processor 206 responsive to detecting an incoming call or an audio message can adjust the audio content and the warning sounds delivered to the ear canal. The processor 206 can actively monitor the sound exposure level inside the ear canal and adjust the audio to within a safe and subjectively optimized listening level range. The processor 206 can utilize computing technologies such as a microprocessor, Application Specific Integrated Chip (ASIC), and/or digital signal processor (DSP) with associated storage memory 208 such as Flash, ROM, RAM, SRAM, DRAM or other like technologies for controlling operations of the earpiece device 100.

The power supply 210 can utilize common power management technologies such as replaceable batteries, supply regulation technologies, and charging system technologies for supplying energy to the components of the earpiece 100 and to facilitate portable applications. The motor 213 can be a single supply motor driver coupled to the power supply 210 to improve sensory input via haptic vibration. As an example, the processor 206 can direct the motor 213 to vibrate responsive to an action, such as a detection of an incoming voice call.

The earpiece 100 can further represent a single operational device or a family of devices configured in a master-slave arrangement, for example, a mobile device and an earpiece. In the latter embodiment, the components of the earpiece 100 can be reused in different form factors for the master and slave devices.

Figure 3:
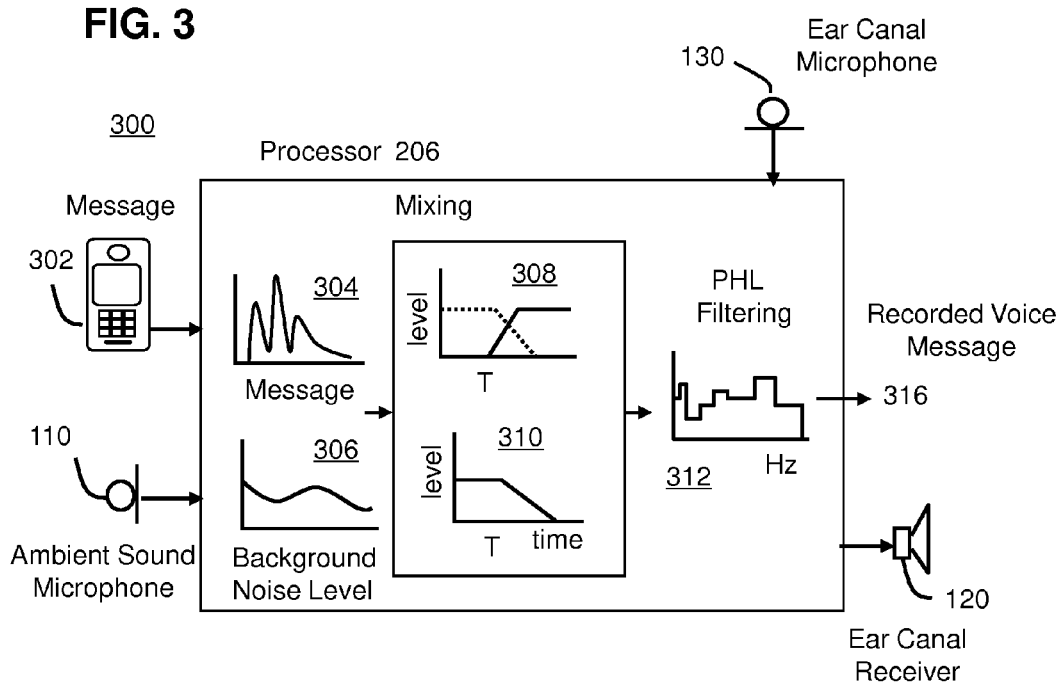
FIG. 3 is a pictorial diagram illustrating a mixed signal output in accordance with an exemplary embodiment.

FIG. 3 is a pictorial diagram 300 illustrating a mixed signal output in accordance with an exemplary embodiment. In general, a signal from an external source such as communication device 302 can be mixed with ambient sound microphone 110 and ear canal microphone 130. More than one external source can be provided such as a multimedia player, computer, radio, and television to name but a few. The mixing of different signals can be varied depending on the situation in which the device is used. Several non-limiting examples will be provided herein below.

An incoming text message is detected by processor 206. In a non-limiting example, processor 206 indicates to the user that a message is present via a sound, physical, or visual queue. Processor 206 can detect user activity and can implement user selected options to immediately provide the message or delay notification for a more appropriate time. For example, the earpiece 100 couples via a wired or wireless connection to other devices located in different physical areas. In particular, one area can be a "do not disturb" area for receiving messages. Processor 206 can delay messages or have a priority (for allowing notification) depending on a determined location. Thus, location is a trigger for determining when a message is delivered.

In another non-limiting example, the user can receive the message 304 through the earpiece 100. Processor 206 converts the text message to audio (text to speech) and the user hears a synthesized voice through receiver 120. The user can respond to the text message in a conventional manner by typing a response to the message. Standard texting can be a default setting where other options are provided by user selection or requested by the earpiece 100 after a predetermined time (after the message has been provided). For example, the user is performing a physical activity such as driving or manual labor and wants to review and respond to emails while the activity is on-going. In the example of driving, text messaging back through a keyboard would produce a hazardous situation for the driver and those around the vehicle since it would defocus concentration from the road and remove physical contact with the steering wheel. Texting while driving is a violation of law in many regions of the world. In at least one exemplary embodiment, a vocal response 316 to the message 304 is recorded and stored in memory. Processor 206 reduces the gain on ambient sound microphone 110 while boosting the gain of ear canal microphone 130. The sound is primarily recorded through ECM 130. The benefit of recording the response using ECM 130 is twofold. First, the background noise level 306 of the recorded voice response is reduced because the ambient sound around the user is not introduced in the response. Also, a more accurate conversion from speech is generated using the signal from ECM 130 because of the consistency and repeatability of receiving the voice signal from the ear canal versus a changing ambient environment.

In one exemplary embodiment, processor 206 reduces a level from ambient sound microphone 110 while correspondingly increasing the level of the ear canal microphone for recording a response. Under high ambient noise levels ASM 110 can provide little to none of the recorded voice signal. Conversely, processor 206 can allow a mixture of the ECM signal and the ASM signal to provide a more realistic sounding signal should the user select that the response be provided as an audio file.

Levels of ASM 110 and ECM 130 are adjusted at time T. The processor 206 upon detecting a vocal response to the text message can decrease the level of ASM 110 as shown in graph 310 and increase the level of ECM 130 as shown in graph 308. Other mixing arrangements are herein contemplated. In general, audio content from communication device 302 or from other devices are muted or decreased in level so as to be inaudible in the recording. Notably, the ramp up and down times of the audio content can also be adjusted based on the priority of the target sound.

Furthermore, the processor 206 can spectrally enhance the audio content in view of one or more factors in a graph 312 before providing the signal for recording. For example, the enhancement can improve high frequency content if the signal is principally taken from ECM 130 or to increase intelligibility for conversion to text. In another example, the user could be whispering a response to the text message. Whispering could be done so as not to be disruptive to others around the user or so others in proximity do not hear the response. The timbral balance of the response can be maintained by taking into account level dependent equal loudness curves and other psychoacoustic criteria (e.g., masking). For instance, auditory queues such as whispering can be enhanced based on the spectrum of the sound captured by ASM 110 or ECM 130. Frequency peaks within the whispered response signal can be elevated relative to noise frequency levels and in accordance with the PHL to permit sufficient audibility of the whispered response.

Figure 4:
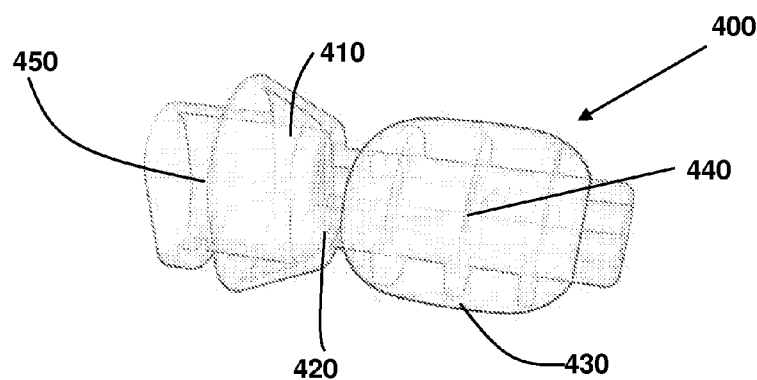
FIG. 4 is an inflatable system for sealing an ear canal in accordance with an exemplary embodiment.

FIG. 4 is an inflatable system 400 for sealing an ear canal in accordance with an exemplary embodiment. Referring to FIG. 1, the earpiece 100 can partially or fully occlude the ear canal 140 via the sealing section 101. In at least one exemplary embodiment, inflatable system 400 is operably configured to earpiece 100 for occluding ear canal 140 via the sealing section 101. Inflatable system 400 comprises an insertion element 420, an expandable element 430, a stop flange 410, and an instrument package 450.

Insertion element 420 is a multi-lumen tube having one or more acoustic channels for providing or receiving sound from the ear canal. Expandable element 430 overlies insertion element 420 for sealing the ear canal. Expandable element 430 can be an inflatable structure such as a balloon. The balloon can be filled with an expanding medium such as gas, liquid, electro active polymer, or gel that is fed the through a supply tube 440. Supply tube 440 is a path for adding or reducing the medium from expandable element 430. The balloon can comprise an elastic or inelastic material. For example, expandable element 430 comprises urethane, nylon, or silicone. In general, expandable element 430 compresses or is deflated such that it readily fits into an ear canal opening. Inflating expandable element 430 seals the ear canal for attenuating sound from an ambient environment. Expandable element 430 conforms to the shape of the ear canal in a manner that is comfortable for extended periods of earpiece use and provides consistent attenuation from the ambient environment under varying user conditions.

Stop flange 410 limits how far the user of the earpiece can insert insertion element 420 and expandable element 430 into the ear canal. Limiting the range of insertion prevents scratching the ear canal or puncturing the tympanic membrane. In at least one exemplary embodiment, insertion element 420 comprises a flexible material that flexes should it come in contact with the ear canal thereby prevent damage to the ear canal wall. The instrument package 450 is an area of the earpiece for holding additional devices and equipment to support the expansion such as power supply, leads, gas and/or fluid generation systems.

Figure 5:
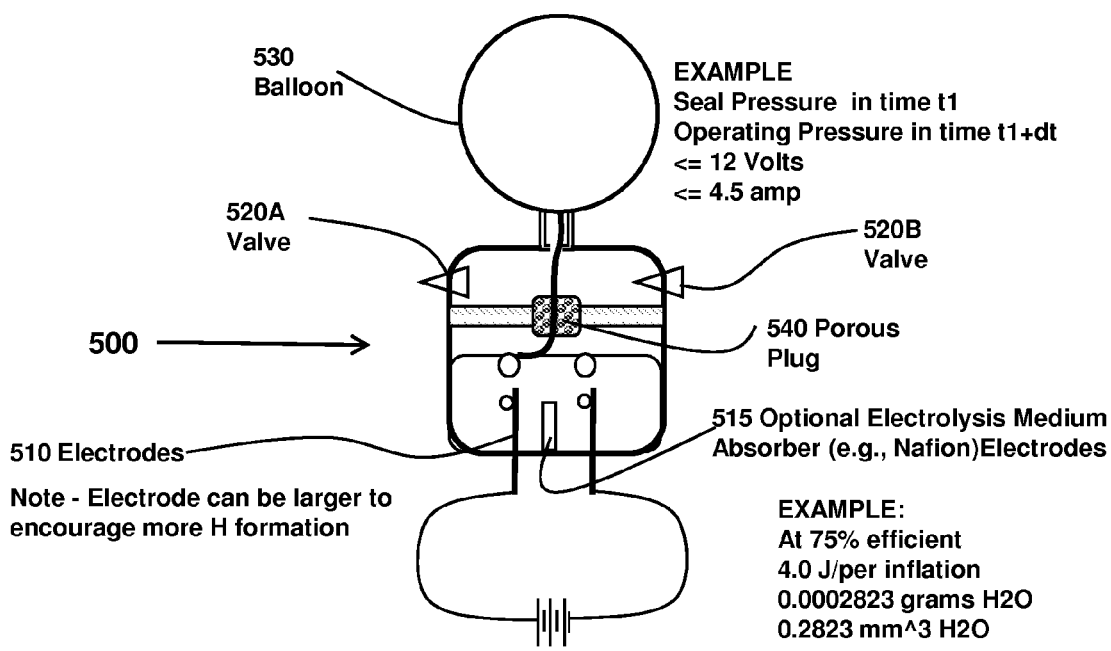
FIG. 5 is an illustration of an inflation device for an expandable element in accordance with an exemplary embodiment.

FIG. 5 is an illustration of an inflation device 500 for an expandable element in accordance with an exemplary embodiment. In the non-limiting example, inflation device 500 is a component of earpiece 100 that inflates a balloon 530 inserted in ear canal 140. Inflation device comprises pressure valve 520A, pressure valve 520B, electrodes 510, a porous plug 540, and optionally a membrane 515.

In at least one exemplary embodiment, inflation device 500 includes a liquid such as $H_2O$ (water) with a salt such as NaCl dissolved therein. For example, NaCl dissolved at a concentration 0.001 mole/liter supports the electrolysis. Electrodes 510 are spaced from one another in the solution. The NaCl allows a current to pass between the electrodes 510 when a voltage is applied across electrodes 510. Electrodes 510 act as if they were essentially in free electrolysis material while at the same time preventing the electrodes 510 from touching. Optional membrane 515 facilitates in reducing a distance between electrodes 510. Reducing the distance between electrodes 510 increases the electric field and hence the current. In at least one exemplary embodiment, membrane 515 is an electrolysis medium absorber such as Nafion.

The electrolysis system shown includes the porous plug 540 that is coupled to a chamber. Gas generated by electrolysis passes through porous plug 540 into a chamber having valves 520A and 520B. The control valves 520A and 520B allow a predetermined gauge pressure value to be reached inside of the chamber (e.g. 50% gauge). The chamber couples to balloon 530. Gas from outside the chamber enters into the chamber if the gauge pressure value drops below the predetermined gauge pressure value thereby regulating the pressure in balloon 530. The gauge pressure in this instance is calculated as the pressure inside the chamber minus the pressure outside the chamber.

Figure 6:
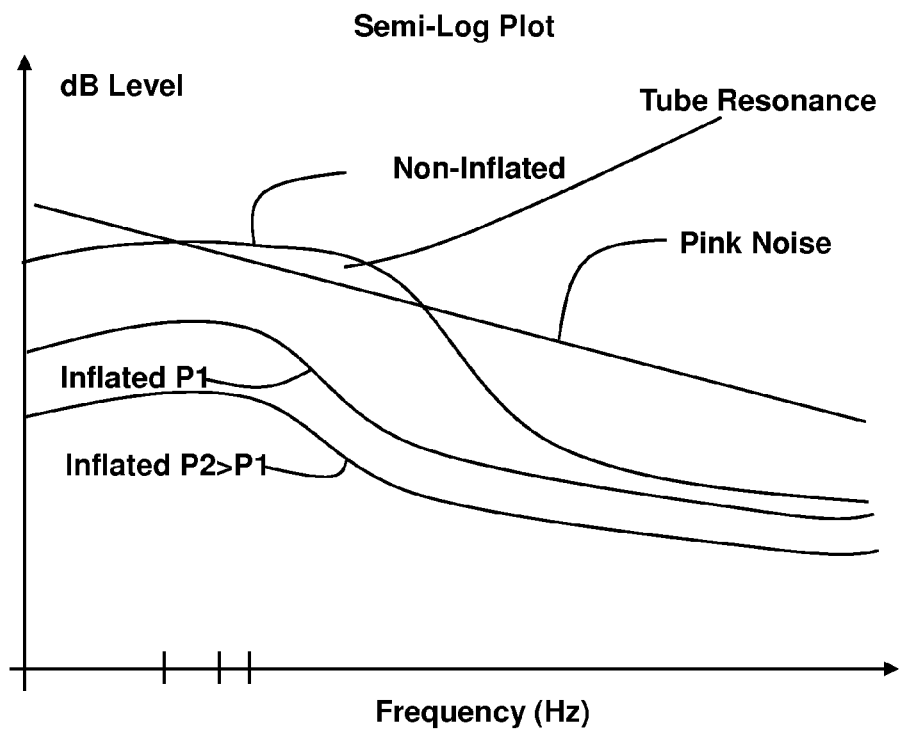
FIG. 6 is an illustration showing attenuation due to occlusion of a balloon in an ear canal at different pressure levels.

FIG. 6 is an illustration showing attenuation due to occlusion of balloon 530 in an ear canal at different pressure levels. Balloon 530 is placed in the cartilaginous region of ear canal 140. A gas or liquid inflating balloon 530 in ear canal 140 applies a pressure on the balloon material pressing the material against the walls of ear canal 140. It has been found that increasing the pressure in balloon 530 correspondingly increases the isolation or attenuation from the ambient environment. Thus, the active system illustrated in FIGS. 4 and 5 allow the attenuation to be varied by controlling the pressure in balloon 530. For example, in a speech to text conversion for responding to a text message the quality of the conversion would be more consistent by detecting the noise level in the ambient space and increasing the pressure of the sealing section (to increase attenuation/reduce background noise) while switching to the ear canal microphone to obtain the response for conversion.

In general, FIG. 6 illustrates sound isolation results (attenuation+reflection) as a function of inflation plotted in semi-log scale in the example of an earpiece. The balloon isolates the ear canal from the ambient environment (outside the ear). The attenuation achieved by providing pink noise in the ambient environment is measured at an ambient side of the balloon and measuring the noise level in the ear canal. The difference in the noise levels is the attenuation provided by the balloon. The plot shows that the attenuation is frequency dependent. Note that the inflation can be varied to obtain a variation in attenuation. Thus, the curve related to pressure P2 has a greater attenuation across the frequency band than inflated pressure P1 where P2>P1.

The inflation can be either a liquid (e.g. water), a gas (e.g. $H_2O$ vapor, $H_2$, $O_2$ gas) or a combination of both. In accordance with at least one exemplary embodiment, the sound isolation level can be controlled by increasing the pressure of the inflatable system in the ear canal above a particular seal pressure value. The seal pressure value is the pressure at which the inflatable system has conformed to the inside of the orifice such that a drop between the sound pressure level on one side of the inflatable system is different from the sound pressure level on the opposite side of the inflatable system by a drop value over a short period of time. For example, when a sudden (e.g. 1 second) drop (e.g. 3 dB) occurs by a particular pressure seal level (e.g. 2 bar).

Figure 7:
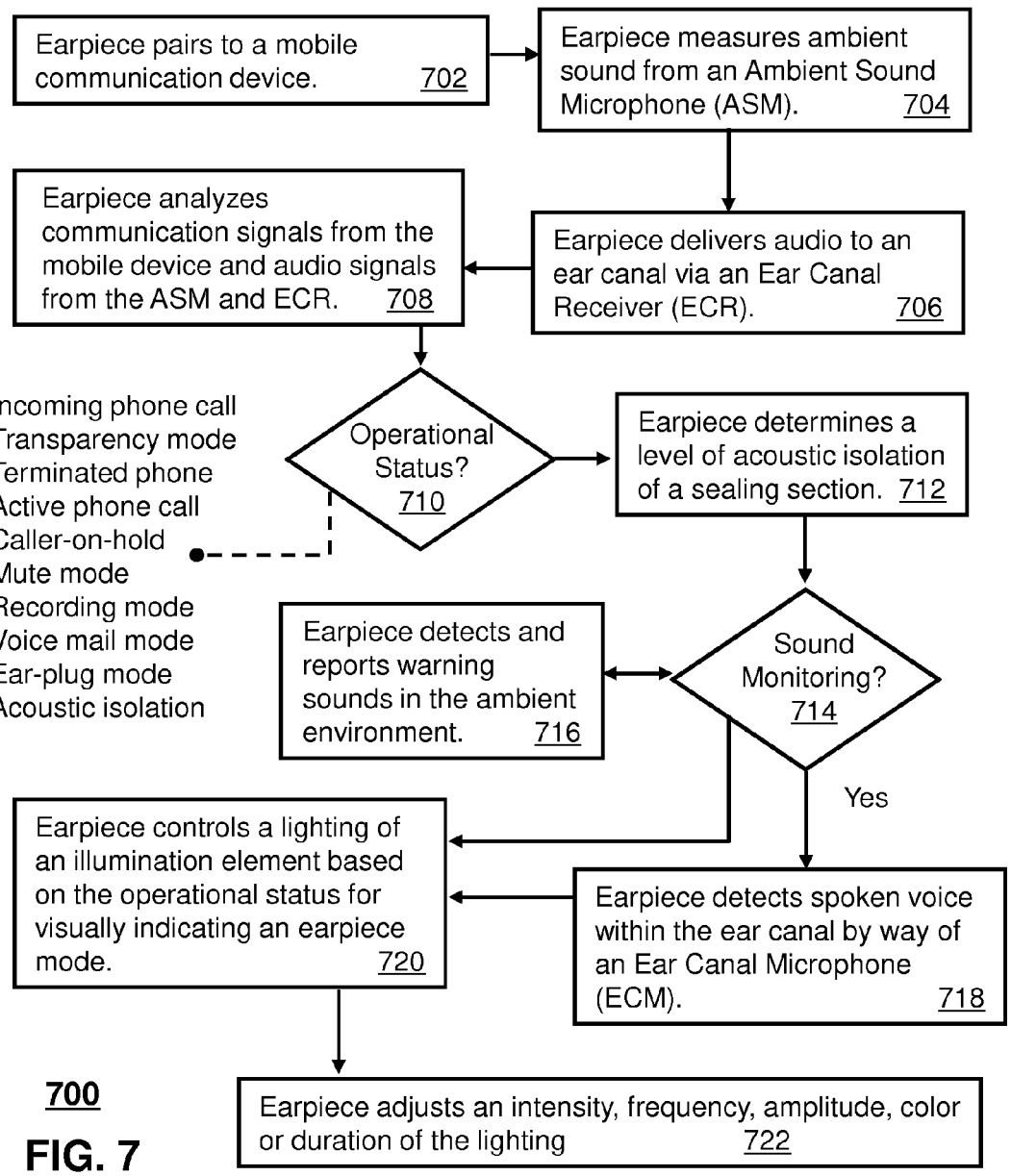
FIG. 7 is a flowchart of a method for visual operational mode indication suitable for use with an earpiece in accordance with an exemplary embodiment.

FIG. 7 is a flowchart of a method 700 for earpiece monitoring and warning detection in accordance with an exemplary embodiment. The method 700 can be practiced with more or less than the number of steps shown and is not limited to the steps or order shown. To describe the method 700, reference will be made to the components of FIG. 2, although it is understood that the method 700 can be implemented in any other manner using other suitable components. The method 700 can be implemented in a single earpiece, a pair of earpieces, headphones, or other suitable headset audio delivery devices.

The method 700 can start in a state wherein the earpiece 100 has been inserted and powered on-manually or automatically. At step 702 the earpiece pairs to a mobile communication device, for example, a cell phone, media player, or other mobile communication device. The pairing can be accomplished by way of a short-range communication protocol such as Bluetooth, ZigBee or other protocol that exchanges network information (secure or unsecure). As an example, the earpiece 100 can pair to a mobile device to permit voice communications over a cellular communication network. As another example, the earpiece 100 can pair with a media player to permit the user of the earpiece to listen to music via a wired or wireless connection.

At step 704 the earpiece measures ambient sound from an Ambient Sound Microphone (ASM) 110. Ambient sounds can include background noise, industrial noise, environmental noise, babble noise from other persons speaking, and other types of acoustic sounds. The earpiece 100 measures an average and instantaneous sound pressure level (SPL) of the ambient sounds and catalogs the SPL, for example, directly to the earpiece 100 or the paired communication device. As an example, the earpiece 100 monitors sound levels and calculate an SPL dose to determine the user's over sound level exposure. This information is recorded and saved to a memory of the earpiece 100, the mobile device, or saved onto a network server. Data compression techniques can be employed to reduce the data memory or bandwidth. As one example, the earpiece 100 periodically samples the ambient environment, for instance every 10 seconds, and saves an SPL level for each time event.

The earpiece 100 permits audible transparency of the ambient environment by way of the ASM 110 and the ECR 120 (see FIG. 1). Audible transparency provides the user the ability to hear local sounds in his or her environment that the earpiece 100 would otherwise acoustically block due to the sealing section 101 (see FIG. 1). Recall, the sealing section 101 (e.g., a balloon system, an inflation management system) occludes the ear canal 140 to acoustically isolate the user from ambient sounds. As explained ahead however, there will be times when the earpiece 100 intentionally passes ambient sound to permit the user to hear the ambient environment; that is, audible transparency. In another arrangement, the earpiece 100 by way of the inflation management system can mechanically "reduce" the seal (for example, deflating the balloon) to permit acoustic sound passage through the ear canal 140. With regards to audible transparency, the processor 206 (see FIG. 2) can process acoustic sound captured from the ASM 110 and pass the processed sound to the ECR 120 for playing reproduced acoustic ambient sounds in the ear canal 140. The processor 206 can further filter the sound in accordance with the techniques discussed previously in FIG. 3.

Returning back to FIG. 7, the earpiece at step 706 can deliver audio to an ear canal via the ECR 120. The audio can be the processed sound resulting from "audible transparency" or audio content such as music provided by way of the paired mobile communication device or a media device (e.g., cell phone, media player, etc.). For instance, in addition to permitting audible transparency, the earpiece 100 can be employed to play music. For example, the user of the earpiece 100 listens to music whilst the earpiece 100 is measuring ambient sounds in the environment.

At step 708 the earpiece analyzes communication signals from the mobile device and audio signals from the ASM 110 and ECR 120. As one example, the earpiece 100 decodes the communication signal from the paired mobile communication device for identifying if voice mail is received. More specifically, the processor 206 (see FIG. 2) upon receiving communication signals or packet data from the transceiver 204 can extract header information to identify a message type: voice mail, phone call, text message, etc. As another example, the processor 206, from the audio signals, can measure background noise levels via the ASM 110 (as in step 704) to determine suitable audio configuration settings. The processor 206 can further analyze the audio content signals with respect to the background noise levels to determine a level of the user's situation awareness; for instance, when the audio content level is too high to permit the user to hear potentially threatening sounds in the environment or warning sounds. Upon analyzing the communication signals and audio signals, the earpiece 100 at step 710 identifies an operating mode.

The operating mode (or operational status) can be an active phone call, an incoming phone call, a terminated phone call, a caller-on-hold condition, a recording mode, a voice mail mode, a mute mode, an audible transparency mode or an ear-plug mode (e.g., audible transparency disabled). The operational mode can also correspond to receipt of voice mail or listening to audio content from a personal audio player. The operating mode can also correspond to a recording mode wherein the earpiece 100 may record audio from the ASM 110 or the ECM 130, for instance, to permit the user to hear previously captured sounds in their environment or in conversations. As explained ahead, the operational mode can further correspond to sound signature detection mode whereby the earpiece 100 is listening for specific sounds in the environment by way of the ASM 110. Furthermore, the operational mode can correspond to a voicing level or voice activity level.

At step 712, responsive to determining an operational mode, the earpiece 100 determines a level of acoustic isolation of the sealing section 101 (see FIG. 1). As previously illustrated in FIG. 4, the expandable element 430 overlies insertion element 420 for sealing the ear canal 140 and providing the acoustic isolation. As shown in FIGS. 4 and 5 the expandable element 430 can be an inflatable structure 500, for example, comprising a balloon 530. As one example, the level of acoustic isolation can be predetermined; that is, mapped to the balloon expansion, for example, in a table stored in memory. Incremental changes in balloon size can each correspond to an increased noise reduction level. For example, a 1 unit change increase in air pressure corresponds to 1 dB of noise reduction. Alternatively, fixed balloon inflation sizes can correspond directly to specific noise reduction levels. For example, 5 inflation levels can correspond to noise reduction ratings of 10, 15, 20, 25 and 30 dB SPL.

The earpiece 100 can also assess the level of acoustic isolation by way of acoustic tests. For example, the processor 206 can generate an audio signal with known time and spectral characteristics that is directed for audible reproduction out of the ECR 120 as an acoustic test signal. The acoustic test signal when directed to an occluded ear canal can then be measured in-situ by the ECM 130. The processor 206 can analyze the captured acoustic test signal to determine the sealing level. Notably, the processor 206 can associate frequency and amplitude changes as a function of the sealing level—such parameters will change in a predetermined manner based on the degree of sealing. The processor 206 can also monitor sounds from the ASM 110 to assess a level of acoustic leakage due to the sealing section 101. It should be noted that the level of acoustic isolation is another operating mode parameter.

Given that the earpiece 100 captures and measures acoustic sounds in the environment by way of the ASM 110 or acoustic sounds within the ear canal by way of the ECM 130, the earpiece 100 at step 714, determines if sound monitoring is enabled. For instance, as shown in step 716, the earpiece 100 detects and reports warning sounds in the ambient environment. More specifically, the processor 206 extracts features from the ambient sound and compares the features to sound patterns in a stored memory. Features that match certain characteristics of the sound pattern are then associated with predetermined sounds. Warning sounds such as a bell, whistle, horn, and siren each have a distinguishing sound pattern with characteristic features. Aspects of sound signature identification are discussed in a Utility patent application Ser. No. 11/942,370 claiming priority from Provisional Application No. 60/883,013 the contents of which are hereby incorporated by reference in its entirety.

At step 718, the earpiece 100 can further detect spoken voice within the ear canal 140 by way of an Ear Canal Microphone (ECM) 130. The ECM 130, which is situated in the ear canal 140, picks up the user's voice when the user speaks. This is in addition, to the ASM 110 that captures the user's voice. As a result of the sealing section 101, the ECM 130 is effectively acoustically isolated from the ambient sounds in the environment. This permits the ECM 130 to capture a good voice quality signal from the ECM 130 when the user is speaking in adverse ambient noise conditions. Even with audible transparency enabled, the earpiece 100 by way of the processor 206 can effectively cancel out the reproduced ambient noises passed from the ASM 110 to the ECM 130. Furthermore, the processor 206 can monitor a sound pressure level (SPL) within the ear canal 140 and capture the bone conducted voice signals within the ear canal 140 for determining a voicing level. The voicing level describes the vocal exertion of the user to articulate during high ambient background noise conditions. For example, a user will naturally attempt to speak louder in the presence of background noise. The processor 206, by monitoring the SPL of the noise, and the bone conduction signal from the ECM 130, can determine the voicing level. The processor 206 can also determine a voice activity level, which describes when the user is speaking, at what level, and how often, and if there is silence. The voicing activity level can also be expressed as a voice level, for example, the degree of periodicity in the user's speech.

Upon determining an operating mode, the earpiece 100, at step 720, can control a lighting of the illumination element 106 for visually indicating the operational mode. More specifically, the earpiece 100 adjusts, at step 722, an intensity, frequency, amplitude, color or duration of the lighting based on the operational mode. For example, the illumination element 106 may be a certain color (e.g., red) if the user is engaged in a phone call. The red signifies to others in the vicinity that the user is unavailable to speak. The illumination can increase or decrease in brightness as a function of the voicing activity level, for instance, if the user is talking louder. The earpiece 100 can also modulate the illumination based on a speaking rate or on background noise conditions. As another example, the earpiece 100 may display a "blue" lighting if the user is checking voice mail, thereby indicating to others in the vicinity that see the blue light, that the user is tentatively available to speak to.

As yet another example, the illumination element 106 may display green when the user is listening to music from a media player, thereby indicating to others an availability to speak. During music listening, the earpiece 100 can also change illumination to "red" upon detecting a warning sound, followed by turning down the music in the earpiece 100 and increasing audible transparency. This can also be a visual indication to others in the user's near proximity that a warning sound has been detected. It should also be noted that the earpiece 100 can communicate the operational mode (or status of sound signature mode, voice activity level, etc.) to the paired communication device for visual display. In such regard, the user can refer to the paired mobile device to see the operational mode (or status) of the earpiece 100. This can be beneficial when the user is unable to visually see the illumination element 106 on the earpiece 100 that they are wearing.

As yet another example, the earpiece 100 can change the lighting of the illumination element 106 when the user is in a recording mode, for instance to "orange", when recording ambient sounds via the ASM 110, internal sounds in the ear canal 140 via the ECM 130, or audio content from the ECR 120. The earpiece 100 can record sounds from the ASM 110 or ECM 130, and adjust the lighting during the recording. In another arrangement, the earpiece 100 can compensate for a user's hearing acuity (e.g., hearing profile) and control the lighting according to the user's hearing acuity. The user can also press the touch sensitive button 104 to establish an operational mode, or operational status, such as when the user does not want to be disturbed. It should also be noted that a second earpiece can be communicatively coupled to the first earpiece. The first earpiece can direct the second earpiece to adjust an illumination element of the second earpiece based on operational mode.

When the earpiece 100 is in sound signature operational mode, the illumination element 106 can be adjusted according to a threat level. For instance, a color coding scheme can be employed to identify threat level; red indicates danger, yellow indicates warning, and green indicates clearance. The earpiece 100 can also adjust a frequency of the lighting based on threat level. For instance, upon detecting a warning, the earpiece 100 can change states to yellow, and during identification flash yellow to indicate it is in the process of assessing the threat. A rising danger can be expressed as an increased flashing of a red color followed by a solid bright red color. The earpiece 100 upon detecting a sound pressure level (SPL) within the ear canal 140 by way of the ECM 130 and regulating a delivery of ambient sounds in the environment by way of the ASM 110 to the ear canal 140 by way of the ECR 120 to provide audible transparency can further control the lighting based on the SPL and the audible transparency to indicate a level of situational awareness.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions of the relevant exemplary embodiments. Thus, the description of the invention is merely exemplary in nature and, thus, variations that do not depart from the gist of the invention are intended to be within the scope of the exemplary embodiments of the present invention. Such variations are not to be regarded as a departure from the spirit and scope of the present invention.

What is claimed is:

1. An earpiece, comprising:
    an Ambient Sound Microphone (ASM) to capture ambient sound from an ambient environment;
    an Ear Canal Receiver (ECR) to deliver audio to an ear canal;
    a transceiver to receive and transmit communication signals from a paired communication device;
    an illumination element to provide light; and
    a processor operatively coupled to the ASM, the ECR, and the transceiver to provide a visual operational mode indication of an operational mode of at least one of the earpiece or the paired communication device via the illumination element,
    where the operational mode corresponds to recording sounds in the ambient environment by way of the ASM.

2. The earpiece of claim 1 where the illumination element is a single color Light Emitting Diode (LED) or a multi-color LED.

3. The earpiece of claim 1 where the operational mode further corresponds to an active phone call, an incoming phone call, a terminated phone call, or a caller-on-hold condition.

4. The earpiece of claim 1 where the operational mode further corresponds to voice mail or audio content reproduction.

5. The earpiece of claim 1 where the operational mode further corresponds to a sound signature detection mode where the earpiece monitors the ambient environment by way of the ASM for at least one specific sound.

6. The earpiece of claim 5, where the processor detects a warning sound and controls a lighting of the illumination element based on a threat detection level of the warning sound.

7. The earpiece of claim 1, where the earpiece is communicatively coupled to a further earpiece, the processor adjusting a further illumination element of the further earpiece based on the operational mode.

8. The earpiece of claim 1, comprising:
    an Ear Canal Microphone (ECM) operatively coupled to the processor to monitor a sound pressure level (SPL) within the ear canal and capture bone conducted voice signals within the ear canal.

9. The earpiece of claim 8, where the operational mode further corresponds to a do not disturb state.

10. The earpiece of claim 8, where the processor regulates a delivery of the ambient sound captured by the ASM to the ear canal by way of the ECR to provide audible transparency and controls a lighting of the illumination element based on a level of the audible transparency.

11. A method for operating an earpiece, the method comprising the steps of:
    capturing ambient sound from an ambient environment via an Ambient Sound Microphone (ASM);
    delivering audio to an ear canal via an Ear Canal Receiver (ECR);
    receiving and transmitting communication signals from a paired communication device;
    determining an operational mode of the earpiece from the ambient sound captured via the ASM, the audio delivered to the ear canal via the ECR and the communication signals; and
    controlling a lighting of an illumination element of the earpiece for visually indicating the operational mode of the earpiece,
    where the operational mode includes identifying at least one predetermined sound from the ambient sound captured via the ASM, the lighting of the illumination element being controlled according to the identified at least one predetermined sound.

12. The method of claim 11, where the controlling of the lighting comprises adjusting at least one of an intensity, a frequency, an amplitude, a color or a duration of the lighting responsive to determining the operational mode.

13. The method of claim 11, comprising decoding at least one of the communication signals for identifying if voice mail is received and lighting the illumination element accordingly.

14. The method of claim 11, comprising decoding at least one of the communication signals for identifying an active phone call, an incoming phone call, a terminated phone call, or a caller-on-hold condition and lighting the illumination element accordingly.

15. The method of claim 11, comprising detecting a warning sound from the ambient sound captured via the ASM and controlling the lighting based on a threat detection level of the warning sound.

16. A method for operating an earpiece, the method comprising the steps of:
- capturing ambient sound from an ambient environment via an Ambient Sound Microphone (ASM);
- delivering audio to an ear canal via an Ear Canal Receiver (ECR);
- capturing sound in the ear canal via an Ear Canal Microphone (ECM);
- receiving and transmitting communication signals from a paired communication device;
- determining an operational mode of the earpiece from the ambient sound captured via the ASM, the audio delivered to the ear canal via the ECR, the sound captured via the ECM and the communication signals; and
- controlling a lighting of an illumination element of the earpiece for visually indicating the operational mode of the earpiece;
- where the operational mode includes detecting spoken voice within the ear canal from a user using the earpiece via the ECM, the lighting being adjusted based on a voice activity level of the spoken voice.

17. The method of claim 16, comprising
- recording sounds from at least one of the ASM or the ECM, and
- adjusting the lighting during the recording.

18. The method of claim 16, comprising
- detecting a sound pressure level (SPL) within the ear canal by way of the ECM;
- regulating a delivery of the ambient sound in the ambient environment captured via the ASM to the ear canal by way of the ECR to provide audible transparency; and
- controlling the lighting based on the SPL and the audible transparency to indicate a level of situational awareness.

19. The method of claim 16, where the step of controlling the lighting comprises compensating for a hearing acuity of the user.

20. An earpiece, comprising:
- an Ambient Sound Microphone (ASM) to capture ambient sound from an ambient environment;
- an Ear Canal Receiver (ECR) to deliver audio to an ear canal;
- an Ear Canal Microphone (ECM) to monitor a sound pressure level (SPL) within the ear canal and capture bone conducted voice signals within the ear canal;
- a sealing section to attenuate background noise levels passing from the ambient environment to the ear canal by way of the ASM and the ECR;
- an illumination element to provide light; and
- a processor operatively coupled to the ASM, the ECM and the ECR to
  - analyze sound levels from the ASM, the ECM and the ECR,
  - determine a level of acoustic isolation of the sealing section, and
  - control a lighting of the illumination element based on the level of acoustic isolation by adjusting at least one of an intensity, a frequency, an amplitude, a color or a duration of the lighting.

21. The earpiece of claim 20, further comprising a touch-sensitive button to establish an operating mode, where the processor provides a visual operational mode indication of the operating mode via the illumination element.

22. The earpiece of claim 20, where the processor
- detects at least one warning sound in the ambient environment;
- audibly reports a threat level of the at least one warning sound; and
- visually adjusts the lighting according to the threat level.

23. The earpiece of claim 20, where the processor adjusts the lighting according to an operational mode that is an active phone call, an incoming phone call, a terminated phone call, a caller-on-hold condition, a recording mode, a voice mail mode, a mute mode, an audible transparency mode or an ear-plug mode.

* * * * *